(12) United States Patent
Tamaya

(10) Patent No.: US 7,264,290 B2
(45) Date of Patent: Sep. 4, 2007

(54) MOUNTING BRACKET ASSEMBLY

(75) Inventor: Kazuyuki Tamaya, Tendo (JP)

(73) Assignee: Pioneer Corporation, Tokyo (JP)

( * ) Notice: Subject to any disclaimer, the term of this patent is extended or adjusted under 35 U.S.C. 154(b) by 297 days.

(21) Appl. No.: 11/124,361

(22) Filed: May 9, 2005

(65) Prior Publication Data
US 2005/0252158 A1 Nov. 17, 2005

(30) Foreign Application Priority Data
May 9, 2004 (JP) ............................... 2004-166411

(51) Int. Cl.
*B60J 3/07* (2006.01)
(52) U.S. Cl. ...................... 296/1.07; 296/214; 296/1.08
(58) Field of Classification Search ................ 296/214, 296/1.07, 1.08; 248/317, 339
See application file for complete search history.

(56) References Cited

FOREIGN PATENT DOCUMENTS

JP 2002-144973 A 5/2002

*Primary Examiner*—Joseph D. Pape
(74) *Attorney, Agent, or Firm*—Sughrue Mion, PLLC

(57) ABSTRACT

The mounting bracket assembly has a main structural member for attaching an electronic instrument. The main structural member has a joining portion to secure the main structural member to a frame of an automotive vehicle. A strut is secured to the main structural member, and the strut is able to abut against a trim secured to the frame so as to receive a reaction force from the trim. A stop lever is fitted on the main structural member, and the stop lever has a first end and a second end opposed to the first end. The stop lever pivots around the first end so that the second end comes toward and away from the trim. The second end is positioned near the trim when the stop lever is in its working position. The main structural member is located between the strut and the stop lever in the working position.

4 Claims, 8 Drawing Sheets

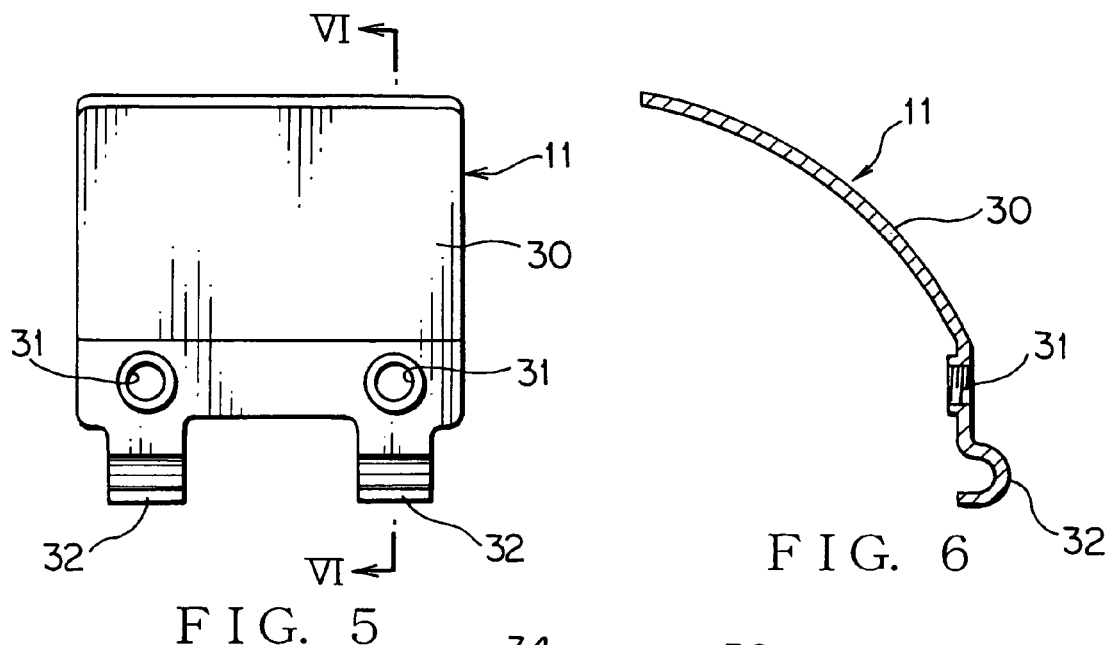
FIG. 5
FIG. 6
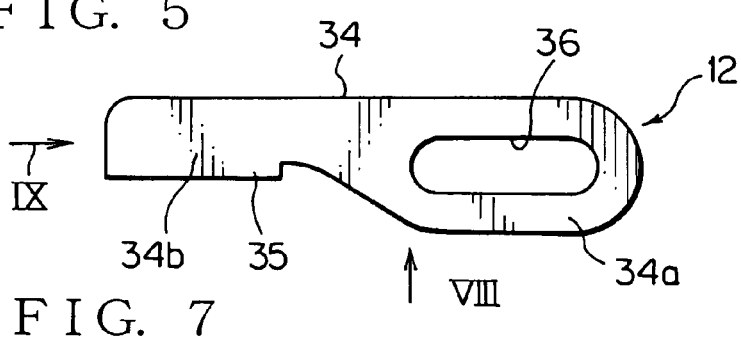
FIG. 7
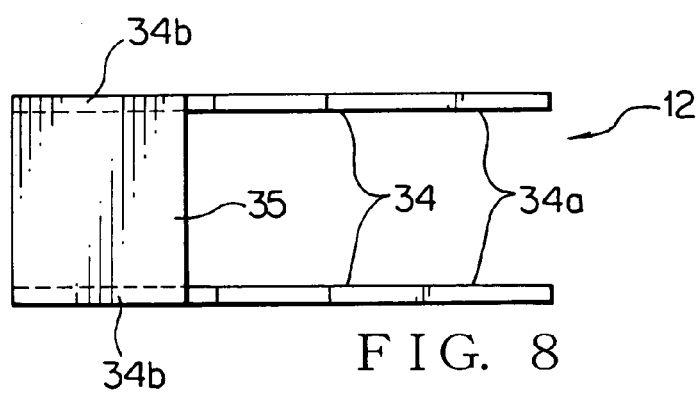
FIG. 8
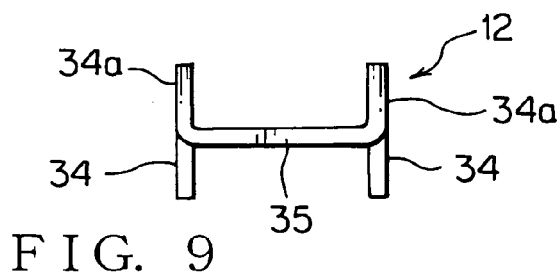
FIG. 9

MOUNTING BRACKET ASSEMBLY

BACKGROUND OF THE INVENTION

1. Field of the Invention

The present invention relates to a mounting bracket assembly, for example, to secure an electronic instrument such as a speaker on a ceiling trim of an automotive vehicle.

2. Background Art

Recently, it has been proposed that a speaker is secured to a ceiling trim of a car cabin. Japanese Patent Application Laid-open No. 2002-144973 discloses a mounting bracket assembly for securing a speaker to a frame of a car. The frame holds a ceiling trim made of a synthetic resin material.

The mounting bracket assembly has a jack nut and a base engaged with the jack nut. The jack nut is press-fitted in a hole of the frame. The base secures a support pillar of the speaker. To secure the speaker on the ceiling trim, a part of the ceiling trim is removed to expose the hole so that the jack nut engages with the base.

However, it is not popular that a car has such a frame with a securing hole. Thus, another mounting bracket assembly made of a metal and hooked on a synthetic-resin-made ceiling trim has been proposed.

The mounting bracket assembly disclosed in the laid-open application is not suitable for securing speakers to various types of cars most of which have no holes in a ceiling trim frame to secure speakers.

Even when the ceiling trim has a securing hole, the hole is covered by the ceiling trim. Thus, it is necessary to remove a part of the ceiling trim for fitting the mounting bracket assembly to the frame. This tends to require a laborious process to secure a speaker on the frame.

Meanwhile, it is difficult to secure a comparatively heavy speaker on a ceiling trim. Because, the ceiling trim is weak in mechanical strength. Thus, only a comparatively small speaker can be fitted on the ceiling trim.

In view of the above-mentioned situation, an object of the present invention is to provide a mounting bracket assembly for fitting a comparatively large electronic instrument such as a larger speaker to trims of various types of automotive vehicles.

SUMMARY OF THE INVENTION

For achieving the object, a mounting bracket assembly according to the present invention includes:
- a main structural member for mounting an electronic instrument, the main structural member having a joining portion to secure the main structural member to a frame of an automotive vehicle,
- a strut secured to the main structural member, the strut being able to abut against a trim of the automotive vehicle so as to receive a reaction force from the trim, the trim secured to the frame, and
- a stop lever fitted on the main structural member, the stop lever having a first end and a second end opposed to the first end, the stop lever pivoting around the first end so that the second end comes toward and away from the trim, the second end positioned near the trim when the stop lever is in its working position,
- wherein the main structural member is located between the strut and the stop lever in the working position.

The mounting bracket assembly has the main structural member with the joining portion that is locked on the frame. This allows comparatively larger electronic instruments to be secured on frames of trims of various kinds of automotive vehicles. Furthermore, the strut abuts against the trim, and the main structural member is positioned between the strut and the stop lever when the stop lever is locked. Thus, the mounting bracket assembly can be secured to the frame without looseness.

Preferably, the mounting bracket assembly further includes a shift mechanism allowing the stop lever to transfer relative to the main structural member along a direction extending from the first end to the second end, the shift mechanism securing the stop lever to the main structural member at any one of positions where the stop lever is transferred between the first and second ends.

Preferably, the stop lever has a resilient piece fitted on the second end so as to cover the second end.

BRIEF DESCRIPTION OF THE DRAWINGS

FIG. 5 is a plan view showing a strut of the mounting bracket assembly of FIG. 1;

FIG. 6 is a sectional view taken along line VI-VI of FIG. 5;

FIG. 7 is a side view showing a stop lever of the mounting bracket assembly of FIG. 1;

FIG. 8 is a plan view taken along arrow VIII of FIG. 7;

FIG. 9 is a front view taken along arrow IX of FIG. 7;

DETAILED DESCRIPTION OF THE PREFERRED EMBODIMENT

Figure 1:
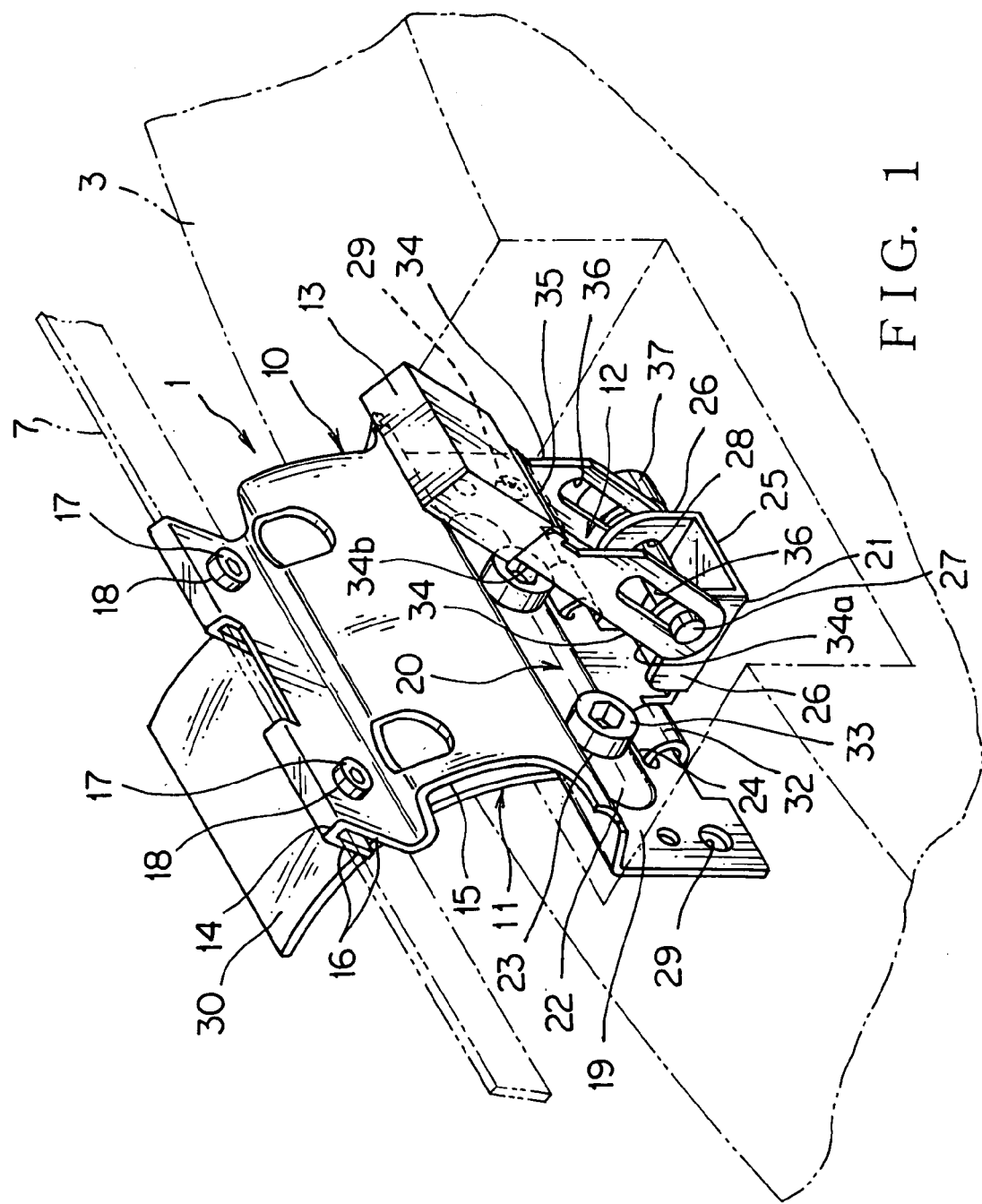
FIG. 1 is a perspective view showing a mounting bracket assembly of an embodiment according to the present invention.

Referring to FIGS. 1 to 15, an embodiment of the present invention will be discussed. In FIG. 1, there is shown a mounting bracket assembly 1 for mounting a speaker 3, which is an electronic instrument, on a ceiling trim 2 (see FIGS. 13 and 14) in a cabin of an automotive vehicle. The mounting bracket assembly 1 is also employed in an automobile vehicle 4 (see FIG. 2) having a rear hatch 5 at an edge of a ceiling trim 2 around the rear hatch 5.

Figure 10:
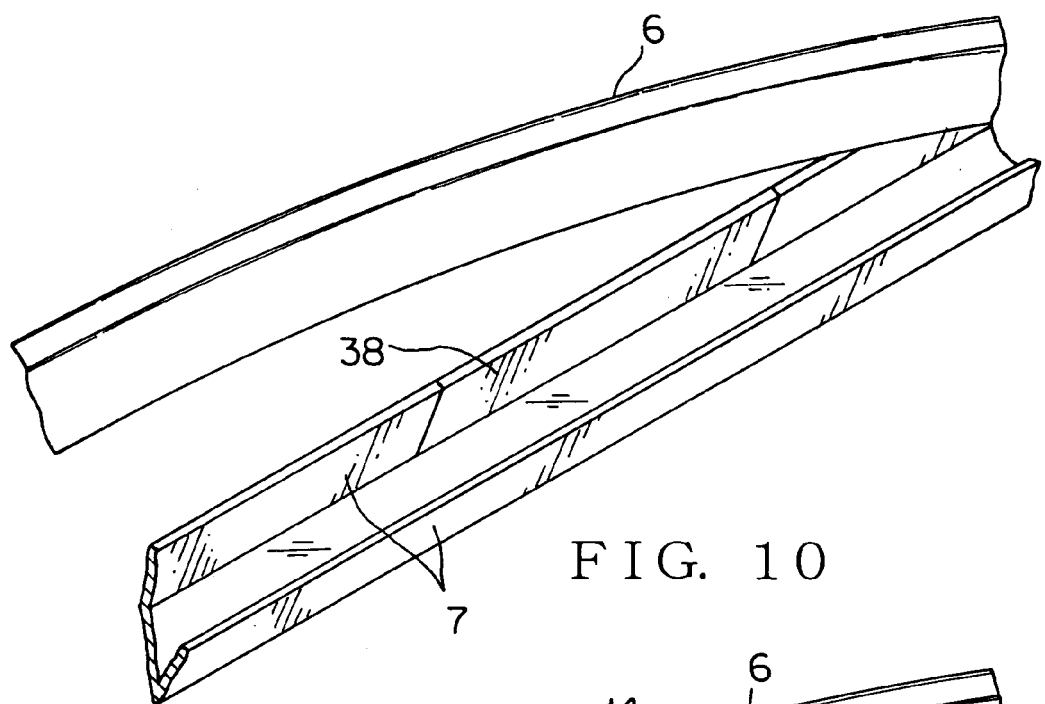
FIG. 10 is an illustration showing a state where a packing is removed from a frame of the automotive vehicle of FIG. 2.

At the edge of the ceiling trim 2 around the rear hatch 5, there is arranged a frame 7 (see FIG. 1) covered by a packing 6 (see FIG. 10). The frame 7 is made of a metal. The packing 6 is a seal disposed between the rear hatch 5 and the frame 7 to prevent water from entering the cabin.

As shown in FIG. 1, the mounting bracket assembly 1 has a main structural member 10, a strut 11, a stop lever 12, and a resilient piece 13.

Figure 3:
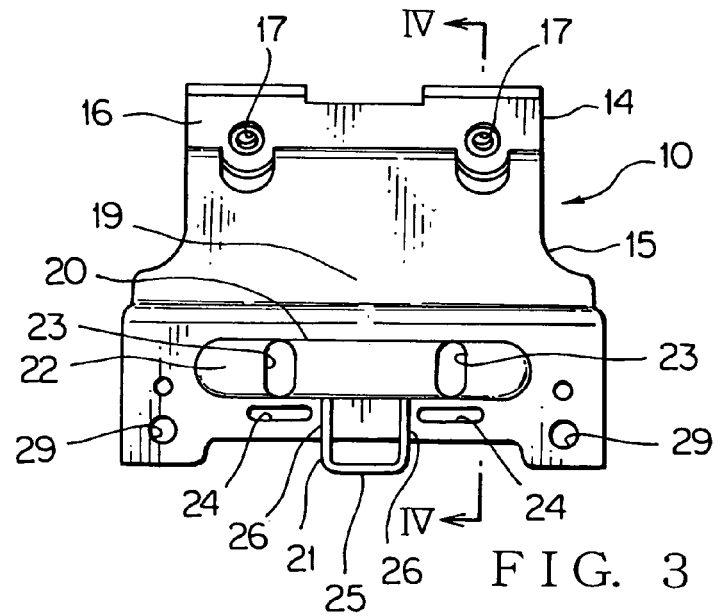
FIG. 3 is a plan view showing a main structural member of the mounting bracket assembly of FIG. 1.
Figure 4:
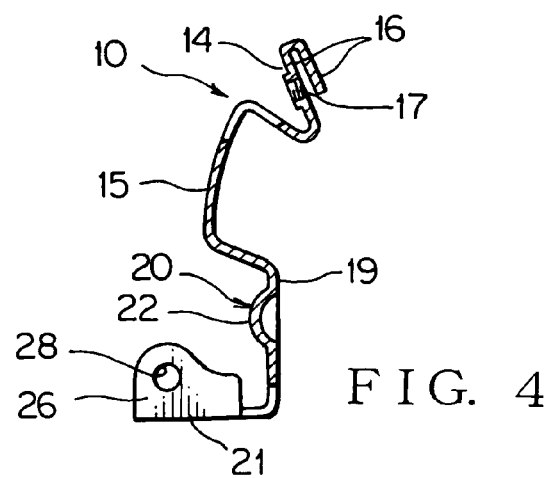
FIG. 4 is a sectional view taken along line IV-IV of FIG. 3.

As shown in FIGS. 3 and 4, the main structural member 10 unitarily has a joining portion 14 and a piece fitting portion 15. The joining portion 14 has a pair of pinching pieces 16 substantially parallel with each other. The pinching pieces 16 are joined to each other at one end to define a hook. The joining portion 14 is hooked on the frame 7 between the pair of pinching pieces 16.

The joining portion 14 has two threaded holes 17 penetrating through one of the pinching pieces 16. A bolt 18 (see FIG. 1) engages with each threaded hole 17.

The piece fitting portion 15 has a generally flat plate part 19, a strut joining part 20, and a lever fitting part 21. The plate part 19 is contiguous with the one of pinching pieces 16. The strut joining part 20 has an arc-shaped ridge 22, two elongated holes 23, and two slots 24. The arc-shaped ridge 22 rises from the plate part 19. The elongated holes 23 penetrate through the arc-shaped ridge 22. The slots 24 are positioned at an end portion opposite to the joining portion 14 of the arc-shaped ridge 22 so as to penetrate through the plate part 19.

The lever fitting part 21 has a connection piece 25 and a pair of support pieces 26. The connection piece 25 is contiguous with an edge of the lever fitting part 21 at the end portion positioned opposite to the joining portion 14. The connection piece 25 extends from an edge of the plate part 19 perpendicular to a surface of the plate part 19 in a direction coming away from the joining portion 14. Each support piece 26 rises from each side end of the connection piece 25 and is parallel with each other. One of the support pieces 26 has a threaded hole 27 and the other has a through bolt hole 28. The threaded-hole 27 and the through bolt hole 28 are coaxial with each other.

The plate part 19 of the piece fitting portion 15 has a plurality of through bolt holes 29 for mounting the speaker 3 on the main structural member 10 of the piece fitting portion 15. The through bolt holes 29 penetrate through the plate part 19.

The strut 11 is a metal plate having a comparatively larger thickness. As shown in FIGS. 5 and 6, the strut 11 unitarily has a main part 30, a threaded hole 31, and a hook part 32. The main part 30 has an arc-shaped section. In this embodiment, two of the threaded holes 31 are provided near one edge of the main part 30 around the hook part 32. The hook part 32 is positioned at one end of the main part 30 and engages with the slots 24.

The strut 11 is laid on a surface of the main structural member 10 around the joining portion 14 of the piece fitting portion 15. The hook part 32 engages with the slot 24 while the bolt 33 (see FIG. 1) engages with the threaded hole 31 via the elongated hole 23, so that the strut 11 is secured on the main structural member 10. The elongated hole 23 is defined in the arc-shaped ridge 22 such that the head of the bolt 33 abuts against the arc-shaped ridge 22. The strut 11 can pivot around the hook part 32, because the head of the bolt 33 slides on a surface of the arc-shaped ridge 22. Thus, the strut 11 moves relative to the ceiling trim 2 fitted to the frame 7 at its end opposite to the hook part 32 of the main part 30. Accordingly, the strut 11 is attached to the main structural member 10 so as to move toward and away from the ceiling trim 2.

A further advancement of the bolt 33 into the threaded hole 31 moves the distal end of the strut 11 to abut against the ceiling trim 2.

The stop lever 12 is made from a metal plate having a comparatively lager thickness and unitarily has a pair of lever pieces 34 and a connection piece 35. The lever pieces 34 are elongated parallel with each other as shown in FIGS. 7 to 9. Each lever piece 34 has one end 34a formed with an elongated hole 36 extended parallel with a longitudinal direction of the lever piece 34.

The connection piece 35 joins the other ends 34b of the lever pieces 34. The one end 34a is the first end of the stop lever 12 and the other end 34b is the second end of the stop lever 12 in connection with the descriptions in the summary of the invention.

Between the pair of lever pieces 34, the pair of support pieces 26 of the piece fitting portion 15 of the main structural member 10 are positioned at the first end 34a. A bolt 37 penetrates sequentially through the one of support pieces 26, one of the elongated holes 36, and the elongated hole 36. Then, the bolt 37 (see FIG. 1) engages with the threaded hole 27 of the other support piece 26 so that the stop lever 12 is fitted to the main structural member 10.

Loosening the bolt 37 causes the stop lever 12 to be pivotable around the first end 34a so that the second end 34b comes toward and away from the ceiling trim 2. The stop lever 12 is moved until the second end 34b contacts the rear hatch 5 to be secured to the main structural member 10.

The strut 11 is extended in the side of the joining portion 14 of the piece fitting portion 15 of the main structural member 10, and the second end 34b of the stop lever 12 is fitted to the lever fitting part 21. Thus, in the mounting bracket assembly 1, the main structural member 10 is located between the strut 11 and the stop lever 12 in its working position.

The loosening of the bolt 37 can change the position of the bolt 37 within the elongated hole 36. That is, the elongated hole 36 allows the stop lever 12 to transfer along a longitudinal direction of the stop lever 12 relative to the main structural member 10. The bolting of the bolt 37 into the threaded hole 27 stops the stop lever 12 at a desired position within the elongated hole 36 so that the stop lever 12 is secured to the main structural member 10 12 at the desired position. The elongated hole 36, the bolt 37, and the threaded hole 27 constitute the shift mechanism described in the summary or the invention.

The resilient piece 13 is made of an elastic material such as a rubber. The resilient piece 13 is fitted to the lever pieces 34 to cover them at the second end 34b.

Next, steps for securing the speaker 3 on the ceiling trim 2 by utilizing thus configured mounting bracket assembly 1 will be discussed.

Figure 2:
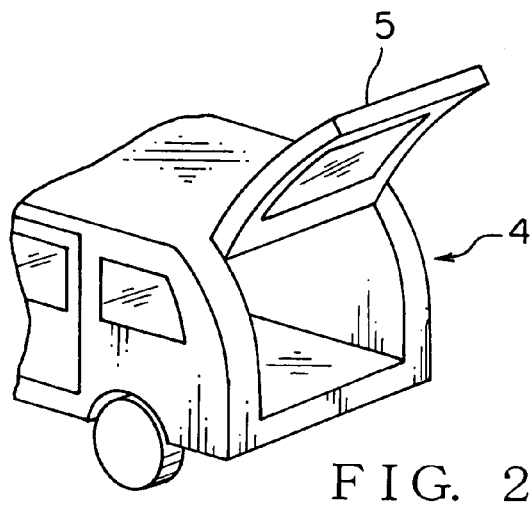
FIG. 2 is a perspective view showing an automotive vehicle applicable of the mounting bracket assembly of FIG. 1.

The rear hatch 5 shown in FIG. 2 is opened firstly. As shown in FIG. 10, the packing 6 is removed from the frame 7. Then, a sheet 38 covers a part of the frame 7 to prevent damage of the frame 7. The sheet 38 may be a synthetic resin of a polyamide, an unwoven fabric, or a resilient material like a rubber.

Figure 11:
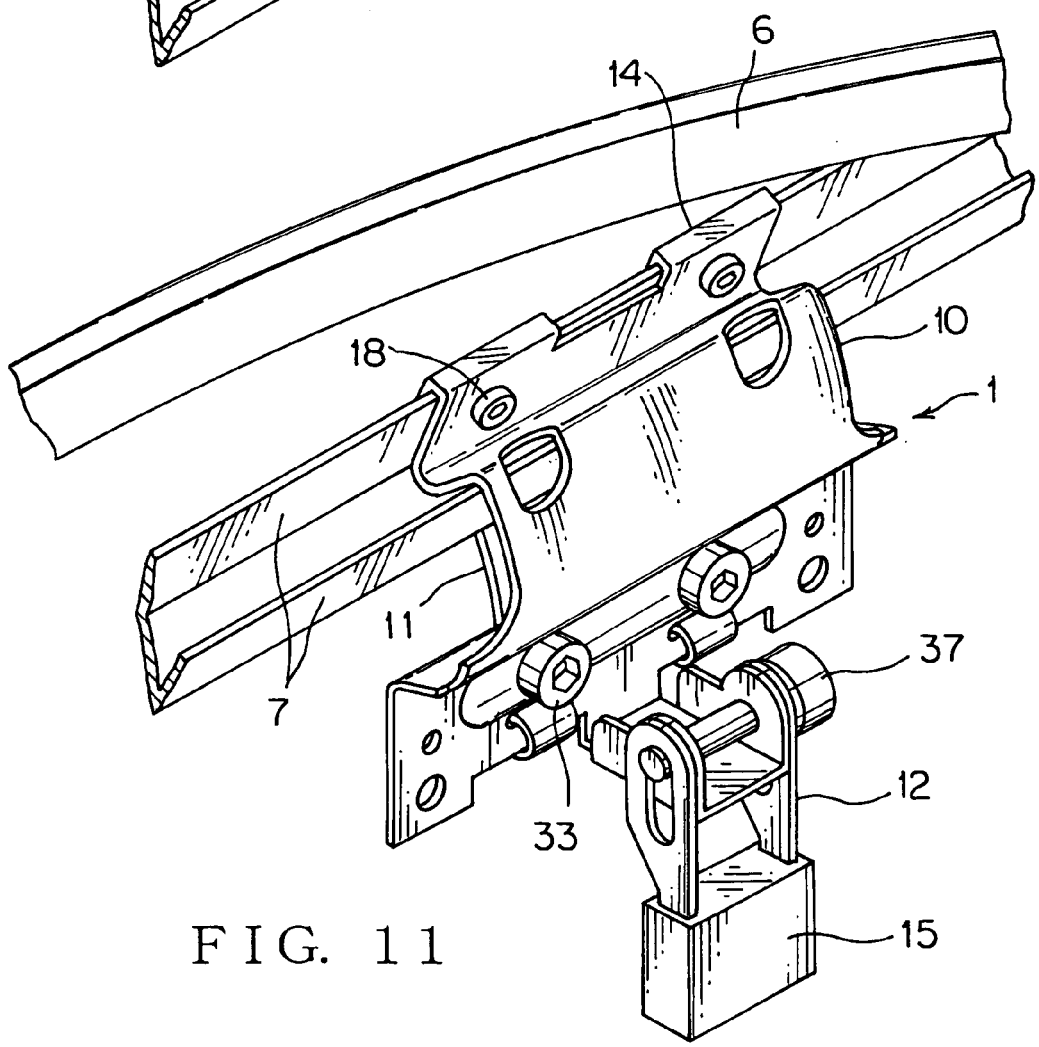
FIG. 11 is an illustration showing a state where a joining portion of the mounting bracket assembly is fitted on the frame of FIG. 10.

As shown in FIG. 11, the bolts 33 and 37 are loosened so that the strut 11 and the stop lever 12 become movable. Then, the joining portion 14 of the main structural member 10 of the mounting bracket assembly 1 is engaged with the frame 7. Bolting of bolt 18 causes itself to firmly contact with the frame 7 so that the joining portion 14 of the main structural member 10 is secured on the frame 7. The packing 6 is re-mounted to cover the joining portion 14 of the main structural member 10.

Figure 12:
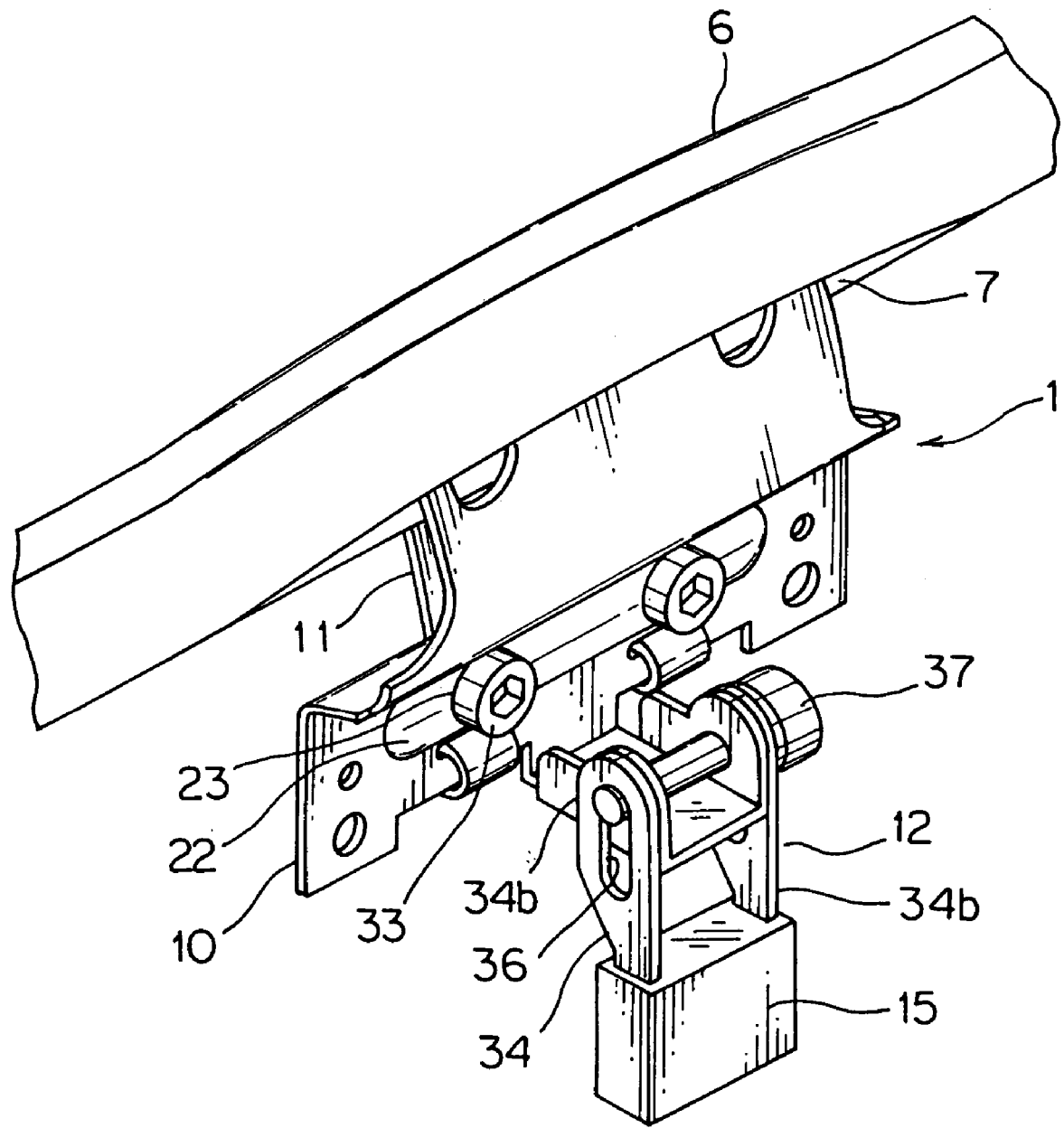
FIG. 12 is an illustration showing a state where a strut of the mounting bracket assembly of FIG. 11 is secured on the main structural member of the bracket.
Figure 13:
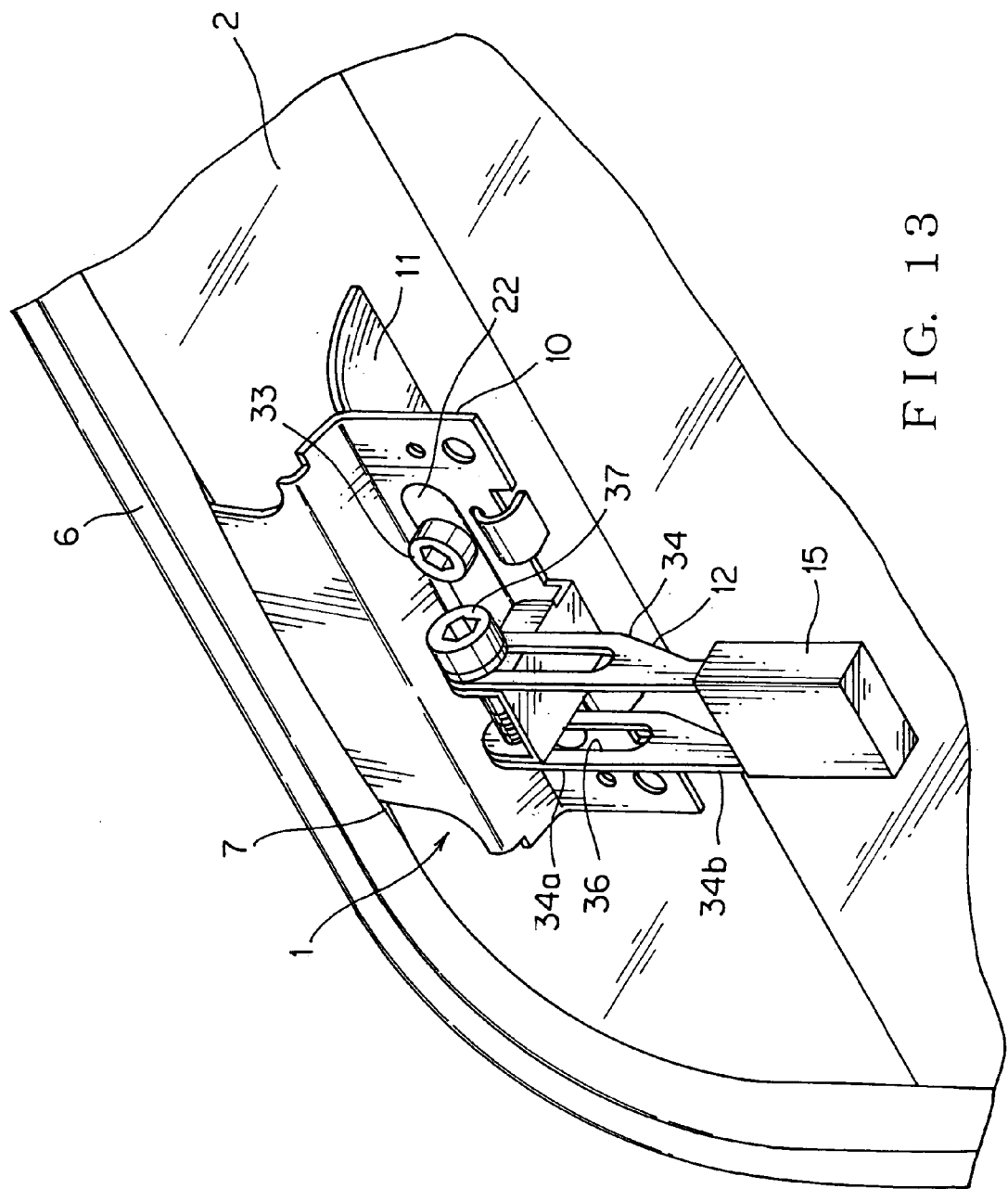
FIG. 13 is another illustration showing a state where the strut of the mounting bracket assembly of FIG. 11 is secured on the main structural member.
Figure 14:
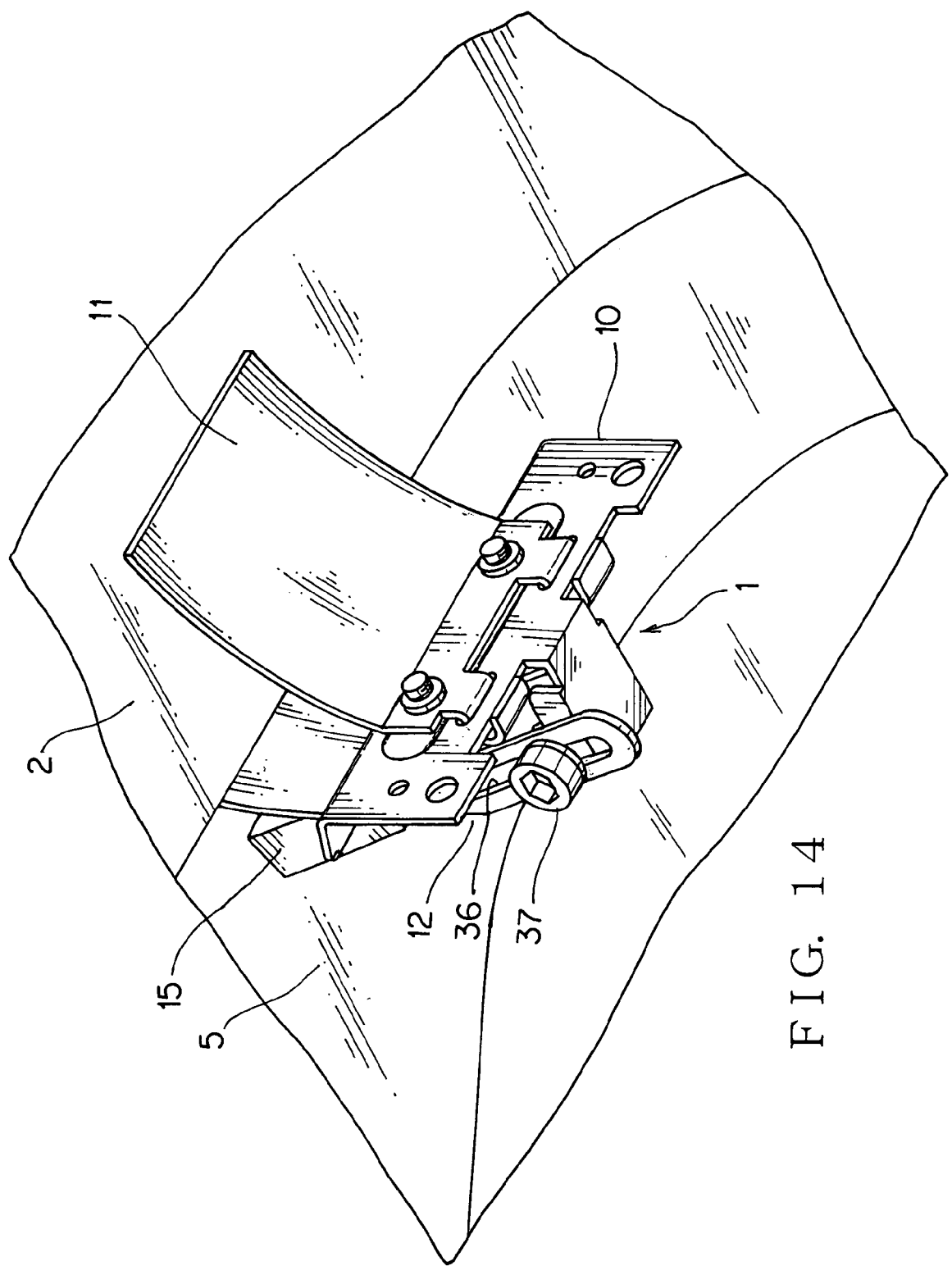
FIG. 14 is an illustration showing a state where a stop lever of the mounting bracket assembly of FIG. 13 is secured on the main structural member.

Next, as shown in FIGS. 12 and 13, the bolt 33 is bolted into the threaded hole 31 of the strut 11. With advancement of the bolt 33, the head of the bolt 33 moves to slide on a surface of the arc-shaped ridge 22 so that the strut 11 transfers toward the ceiling trim 2 gradually. Finally, the strut 11 contacts the ceiling trim 2 to press it and to secure the strut 11 to the main structural member 10.

Then, the rear hatch 5 is closed. The second end 34b of the stop lever 12, namely the resilient piece 13 is moved toward the ceiling trim 2 such that the resilient piece 13 contacts an inner surface of the rear hatch 5. In this state, the bolt 37 is bolted into the threaded hole 27 so that the stop lever 12 is secured to the main structural member 10.

Figure 15:
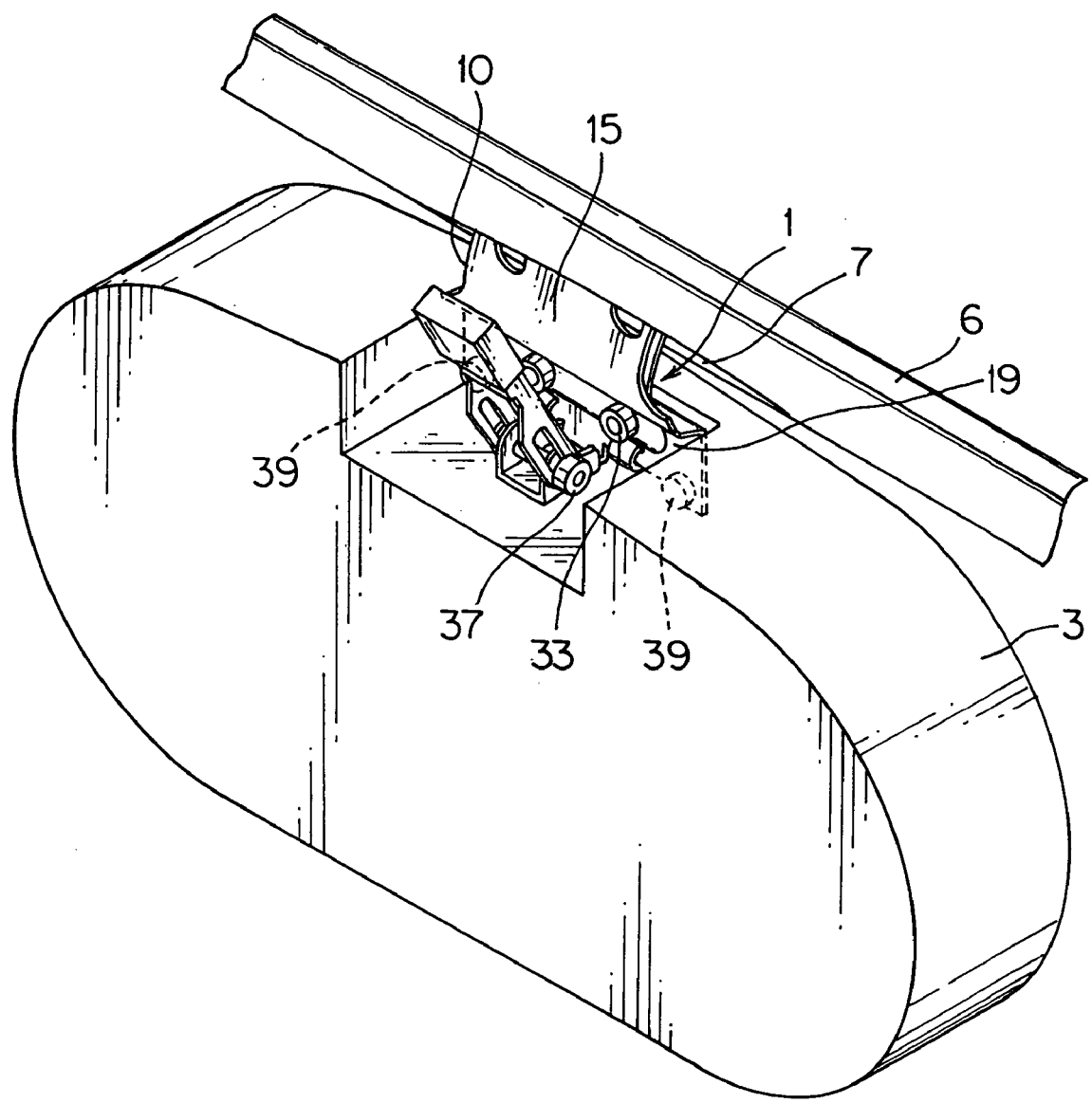
FIG. 15 is an illustration showing a state where a speaker is attached on the mounting bracket assembly of FIG. 14.

Thus, the mounting bracket assembly 1 is secured on the ceiling trim 2. Then, as shown in FIG. 15, the speaker 3 is positioned to contact the plate part 19 of the piece fitting portion 15 of the main structural member 10, and the bolt 39 is bolted via the through bolt hole 29 so that the speaker 3 is secured to the mounting bracket assembly 1 around the ceiling trim 2.

In the embodiment, the joining portion 14 of the main structural member 10 is secured on the frame 7, so that the mounting bracket assembly 1 can be attached to frames of various types of automotive vehicles. A comparatively larger electronic instrument like the speaker 3 can be mounted on the frame 7 since the joining portion 14 is secured on the frame 7.

Furthermore, the strut 11 contacts and presses the ceiling trim 2, and the second end 34b of the stop lever 12 contacts an inner surface of the rear hatch 5 around the ceiling trim 2, such that the main structural member 10 is positioned between the strut 11 and the stop lever 12. Thus, the mounting bracket assembly 1 is secured on the frame 7 without looseness.

Moreover, the strut 11 and the stop lever 12 are secured to the main structural member 10 at a selectable position since the strut 11 and the stop lever 12 are movable relative to the main structural member 10.

The stop lever 12 can be secured to the main structural member 10 at its longitudinal selectable position since the bolt 37 engages with the threaded hole 27 via the elongated hole 36. This provides a flexibility to mount the speaker 3 on the ceiling trim 2 of various types of automotive vehicles.

Since the second end 34b of the stop lever 12 is covered by the resilient piece 13, the resilient piece 13 may contact an inner surface of the ceiling trim 2 or rear hatch 5, causing no damage thereof.

In the aforementioned embodiment, the speaker 3 is mounted on the ceiling trim 2. However, the speaker 3 may be mounted on another type trim, and the stop lever 12 may be arranged to contact any door other than the rear hatch 5 in the present invention. Another electronic instrument like a display may be mounted by the mounting bracket assembly 1 according to the present invention.

The present invention is not limited in the discussed embodiment, but various modified embodiments may be provided within the spirit of the present invention.

What is claimed is:

1. A mounting bracket assembly comprising:
    a main structural member for mounting an electronic instrument, the main structural member having a joining portion to secure the main structural member to a frame of an automotive vehicle,
    a strut secured to the main structural member, the strut being able to abut against a trim of the automotive vehicle so as to receive a reaction force from the trim, the trim secured to the frame, and
    a stop lever fitted on the main structural member, the stop lever having a first end and a second end opposed to the first end, the stop lever pivoting around the first end so that the second end comes toward and away from the trim, the second end positioned near the trim when the stop lever is in its working position,
    wherein the main structural member is located between the strut and the stop lever in the working position.

2. The mounting bracket assembly recited in claim 1 further comprising a shift mechanism allowing the stop lever to transfer relative to the main structural member along a direction extending from the first end to the second end, the shift mechanism securing the stop lever to the main structural member at any one of positions where the stop lever is transferred between the first and second ends.

3. The mounting bracket assembly recited in claim 1, wherein the stop lever has a resilient piece fitted on the second end so as to cover the second end.

4. The mounting bracket assembly recited in claim 2, wherein the stop lever has a resilient piece fitted on the second end so as to cover the second end.

* * * * *